United States Patent

Furniss et al.

[11] 4,057,785
[45] Nov. 8, 1977

[54] SEQUENCE OF EVENTS RECORDER AND SYSTEM FOR TRANSMITTING SEQUENCE DATA FROM A REMOTE STATION TO A MASTER STATION

[75] Inventors: William E. Furniss, Murrysville, Pa.; George I. Vancsa, Wexford; Joseph R. Onufer, Edison, both of N.J.

[73] Assignee: Westinghouse Electric Corporation, Pittsburgh, Pa.

[21] Appl. No.: 558,513

[22] Filed: Mar. 14, 1975

[51] Int. Cl.² .............................................. H04G 9/00
[52] U.S. Cl. ............................... 340/163; 340/152 R
[58] Field of Search ................... 340/163, 147 R, 408, 340/409, 152 R, 413, 172.5, 151

[56] References Cited

U.S. PATENT DOCUMENTS

| | | | |
|---|---|---|---|
| 3,349,374 | 10/1967 | Gabrielson | 340/408 X |
| 3,532,827 | 10/1970 | Ewin | 340/151 X |
| 3,715,741 | 2/1973 | McWade | 340/413 X |
| 3,747,068 | 7/1973 | Bruner | 340/151 |

Primary Examiner—Harold I. Pitts
Attorney, Agent, or Firm—E. F. Possessky

[57] ABSTRACT

Apparatus for detecting and recording status changes of two-state devices in a power network substation, a pipeline substation, or the like. At a substation a remote terminal unit records status changes in its digital memory. When a sequence of status changes occurs, each change is recorded, together with its time of occurrence as measured from the time of occurrence of the first change, thereby reducing the size of memory for recording sequence data. Upon request, data related to a sequence of changes is transmitted to a master station in chronological order of the changes, to simplify processing of such data at the master station. Provision is made to permit the master station to convert elapsed time to real time, and to reduce the time required of the master station to retrieve sequence data from a remote terminal.

22 Claims, 8 Drawing Figures

SEQUENCE OF EVENTS RECORDER AND SYSTEM FOR TRANSMITTING SEQUENCE DATA FROM A REMOTE STATION TO A MASTER STATION

BACKGROUND OF THE INVENTION

In the operation of networks for transmission of electrical energy, natural gas, oil or the like, it is desirable to record status changes (events) of various two-state devices included in a network substation, such devices typically including circuit breakers, start-stop actuators and two-position valves. It is useful to record sequences of such changes as they occur in a substation, together with the time of occurrence of each change, for such sequence data is available for transmission to a central station, where the data is stored for subsequent correlation with sequence data from other substations. At the substation level such recorded sequence data permits an investigation of events which transpired during a major network change such as a large power outage. At the central station level, sequence data from a plurality of substations permits a study of the propagation of a change through the network.

Previously sequence of events data has been recorded automatically at unmanned substations, but the recorded data was collected manually, often necessitating trips to substation sites that are relatively inaccessible.

In some sequence of events data recorders, sequence data is stored on magnetic tape and subsequently is transmitted to a central staion through a data communication channel. Such recorders, however, perform no other function, and utilization of these recorders is costly, especially when it is desired to record data at a large number of substations each requiring its own recorder.

In a proposed data acquisition and supervisory control system for an electric power network, a remote terminal controller also records sequence of event data at its substation, but the time of an event is recorded as absolute time, which requires a real time clock and increases the size of memory for storage of sequence data.

There appears to be a need for a sequence of events recorder that records sequence data with reduced memory requirement, and without costly means for measuring the time of occurrence of a detected event. Such a recorder is desirably adapted for inclusion in a data acquisition and supervisory control system, whereby the cost of sequence data collection is reduced. In such a recorder it is further advantageous to record sequence data at a substation and to transmit wuch data to a master station in a manner that reduces the amount of time required of the master station to retrieve and process sequence data from a remote station, whereby the time available to the master to perform other functions correspondingly is increased.

The description of prior art herein is made on good faith and no representation is made that any prior art considered is the best pertaining prior art nor that the interpretation placed on it is unrebuttable.

SUMMARY OF THE INVENTION

According to the present invention, apparatus for detecting status changes of one or more two-state devices periodically detects the state of each device. The currently detected state of each device is compared with its previously detected state, to detect a difference between such states. When a difference is detected, the identity of the device is recorded, together with its current state and the time at which the difference is detected.

DESCRIPTION OF THE PREFERRED EMBODIMENT

Figure 1:
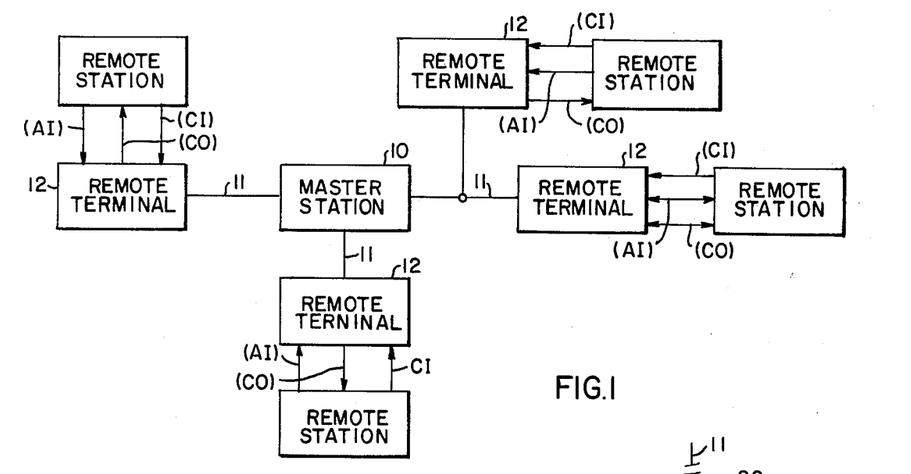
FIG. 1 shows a data communication and control system according to the present invention.

Referring to FIG. 1 there is shown a data communication and control system including a master station 10 connected through a bi-directional communication channel 11 to each of a plurality of remote terminals 12. A remote terminal 12 is installed at a remote station, such as a power network substation or a pipeline pumping station, that is usually remotely located from the master 10. At its remote station, a remote terminal 12 typically periodically reads and stores the values of various process variables that are measured and transmitted to the remote terminal as analog inputs (AI). A remote terminal 12 also periodically scans various contact inputs (CI), each of which represents the status of a two-state device, such as a circuit breaker, that is included in the remote station. Such status information is processed and stored in a remote terminal 12 as hereinafter described. A remote terminal 12 also operates various two-state components that are included in the remote station, for example a two-position valve, by opening or closing a contact output (CO) associated with the component whose state is to be changed. Such contact closure operations are performed by a remote terminal 12 in response to a message that is transmitted from the master station 10 through the respective communication channel 11 to the remote terminal such message identifying the component whose status is to be changed and the desired new state of that component.

Periodically the master station 10 sends a message through the respective channel 11 to request each remote terminal 12 to transmit various analog input and contact input data that is stored within the remote terminal 12. Upon receipt by the master station 10, such information is stored and utilized for subsequent generation of reports concerning the operations of the various remote stations and for determination of various control actions that are transmitted to the remote terminals, which execute such actions through their associated contact outputs.

Each time a remote terminal 12 scans the status represented by each of its contact inputs, the detected status of the input is stored by the remote terminal 12 together with the corresponding identity of the contact input. A remote terminal 12 scans all of its contact inputs in succession, periodically and repetitively. However, for purposes of storage economy, only the result of the most recent scan is stored within a remote terminal 12. Such current status information then is available for transmission to the master station 10 upon demand by the master station.

At times, a time series of status changes takes place at a remote station; often, the duration of such a time series is longer than the time to scan all of the contact inputs at that station once, so that the current status as stored in a remote terminal 12 records at any given time only a part of the information related to such a time series of changes. Because it is desirable that the master station 10 have access to all of the data relating to such a time series of status changes, provision is made within a remote terminal 12 to store separately each detected status change, the current status after the change, the identity of the contact input, and the time of detection of the status change. Generally, such information is stored for a multiplicity of scans, typically lasting several minutes, whereby there is ample capacity to hold information relative to a sequence of changes at a station. Such information then is available for transmission to the master station 10 by a remote terminal 12, upon receipt of an appropriate request generated by the master station 10.

When a disturbance is propagated through a power network, for example, with the result that a first sequence of changes occurs at one substation, and a second sequence of changes occurs at another substation, the events in the first sequence being somewhat offset in time from the events of the second sequence due to the propagation time of the disturbance through the power network. Then each remote terminal 12 records the particular sequence of events at its associated substation, and holds the data relating to such a detected sequence in memory until it receives a request for such data from the master station 10. In response to such request, a remote terminal 12 transmits the sequence of events data related to its associated station to the master station 10, which stores the transmitted data received from each remote terminal 12. Thereby the master station 10 is a central data bank for storage of the sequence of events data from the various remote terminals. Such stored data are useful for studying station sequence of events data in time relation to the station sequence of events data of other stations, to reconstruct the propagation of a disturbance through the network.

REMOTE TERMINAL

Figure 2:
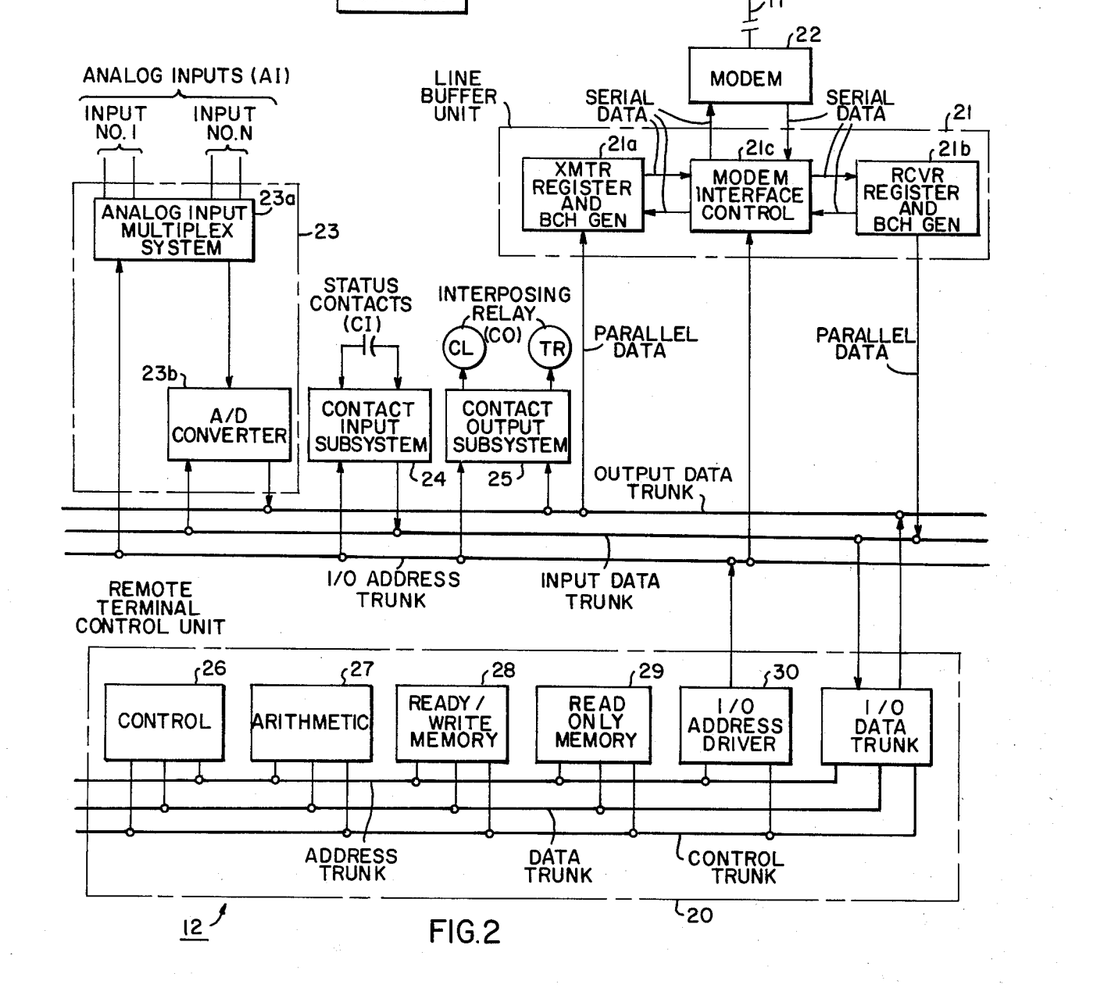
FIG. 2 schematically shows the organization of a remote terminal unit included in the system shown in FIG. 1.

Referring now to FIG. 2, a remote terminal 12 is shown schematically. Preferably the remote terminal 12 is a Redac 70 Remote Terminal Unit, commercially available from Westinghouse Electric Corporation, Industry Systems Division, Pittsburgh, Pennsylvania 15238, and described in Descriptive Bulletin 40-552, also available from the aforesaid Industry Systems Division.

The remote terminal 12 includes a remote terminal control unit 20 to control the overall operation of the terminal, a line buffer unit 21 and a cooperative data modum 22 to transmit and receive data through a bi-directional communication channel 11, and a process interface system which includes an analog input subsystem 23, a contact input sybsystem 24, and a contact output subsystem.

With reference to the remote terminal control unit 20 (RTCU), clock pulses from a timing source provide an input to a control sequencer included in a control unit 26, which operationally controls the RTCU by determining the timing of the gating functions performed by the control unit. The control unit 26 applies information to the address, data and control trunks in accordance with program requirements.

An arithmetic unit 27 performs logic functions and works in conjunction with the control unit 26 to determine gating paths for applying information to the data and address trunks.

A read-only memory unit 29 contains wired programs for operation of the remote terminal 12 and includes a plurality of printed circuit modules, each of which contains 64 16-bit words of memory and utilizes diodes to provide the program storage in such memory. In addition to the program memory, the read-only memory unit 29 includes necessary address selection circuits, bit sense amplifiers, and data trunk isolations routines.

The functional routines stored in the read-only memory unit 29 are applied to the data trunk in response to address and enabling control inputs. These routines constitute instructions to the control unit 26 and to the arithmetic unit 27 for operations to be performed. The first six bits on the address trunk are used to address a particular word on any read-only memory module, and the remaining bits specify which module is to be addresed.

A read-write memory unit 29 includes one or more printed circuit modules and contains registers which function as accumulators and a number of registers used for data storage as hereinafter described. In addition, there are address selection circuitry and isolation circuitry for data input and output. Each read-write memory module contains 64 12-bit words. The first six bits on the address trunk provide the word selection and the remaining address bits provide the module selection. The address, along with the read-write control line, enables either the contents of the data trunk to be written in memory or the contents of memory to be applied to the data trunk.

An input-output (I/O) address driver 30 decodes the information on the RTCU address trunk for use in address selection of the various input/output devices outside the RTCU, such as the contact input subsystem 24, the contact output subsystem 25, and the analog subsystem 23. The I/O data trunk converts information on the RTCU data trunk to the level required by the various input/output devices, and converts logic levels of the input/output devices to levels compatible with the RTCU.

With regard to the line buffer unit 21 and the cooperative modem 22, the line buffer includes a transmitter register 21a to hold data for transmission through the channel 11, a receiver register 21b to hold data received from the channel 11, and a modem interface control 21c to control the flow of data to and from the modem 22 as such data is transmitted and received. Generally, the line buffer unit 21 provides buffer storage between the relatively slow transmission rate of the channel 11 and the much higher data processing rate of the RTCU 20. Additionally, the line buffer unit 21 performs bit-parallel to bit-serial conversion when transmitting, and bit-parallel conversion when receiving, as data is transmitted and received through the communication channel 11 bit serially.

The modem 22 is used to transmitting and receiving signals on the channel 11. Data is transmitted and received bit serially, each bit being encoded for transmission as a single cycle sinusoidal signal that is carried by the channel 11, wherein the sinusoidal period is controlled at one of two fixed values, in accordance with the value of the bit the sinusoidal cycle represents. The modem 22 is capable of operation in full duplex mode, wherein a bit is encoded for transmission while another bit is decoded for reception. Typical tansmission rates through the channel 11 are 1,200; 1,800; and 2,400 bits per second.

The contact input subsystem 24 is provided to detect the status of various two-state devices such as circuit breakers, disconnect switches and contacts on alarm devices, such two-state devices being included in the associated remote station. Each device whose status is detected belongs to a group of twelve such devices, and the contact input subsystem 24 detects the status of all devices in a group simultaneously. The detected statuses are represented by a corresponding twelve-bit binary word that is applied by the contact input subsystem 24 to the input data trunk, such binary word having a bit to represent the detected state of each device in the group. Each group of twelve devices is identified by a binary address that is unique to that group. When the address of a group is generated on the I/O Address Trunk, the contact input subsystem 24 detects the statuses of the devices in that group, and generates the binary word representive of the detected statuses on the input data trunk.

Typically, the statuses of such two-state devices are detected by the contact input subsystem 24 one group at a time, in succession, until all groups are detected. The read-only memory 29 determines the order in which the groups are detected, by periodically generating the group addresses as stored in the read-write memory 29 on the address trunk and through the I/O address driver to the I/O Address Trunk. Thus, the statuses of the two-state devices are detected periodically, wherein one contact input scan comprises detecting such statuses one group at a time, in succession, until all groups are detected once.

The contact output subsystem 25 provides a set of contact output relays which are opened or closed under control of the read-only memory program. Each cotact output relay is connected to operate a two-state device included in the associated remote station, such as a motor start stop device, a breaker trip/close device, or a control valve raise/lower device. Typically a contact output relay is connected to operate its respective two-state device through an interposing relay, which accommodates the relatively low current level of contact output relay to the relatively higher current level required by the corresponding two-state device. Contact output relays are grouped, each group having a unique binary address. When the read-only memory program determines that a contact output relay is to be opened or closed, the read-only memory program control generation of the address of the group which includes the particular relay, which address is transmitted on the address trunk through the I/O address driver to the I/O Address Trunk. The data specifying the desired new state of the particular relay is transmitted through the I/O data to the output data trunk. In response, the contact output subsystem 25 changes the particular relay to the desired new state.

The analog input subsystem 23 includes an analog multiplex system 23a and an analog-to-digital converter 23b, which are controlled by a subroutine of the read-only memory program. On a continuing basis, at a frequency determined by the analog-to-digital conversion rate, analog quantities are converted to ditital form and the updated readings are stored in a portion of the read-write memory 28. Upon request from the master station 10 for data, such stored readings are read-out of the read-write memory 28 and transmitted through the line buffer unit 21 to the master station 10. The analog-to-digital converter 23b is used to convert an analog quantity to a digital form. The particular analog quantity that is converted is selected by the analog multiplex system 23a, and the selected analog quantity is transmitted to the input of the analog-to-digital converter 23b. When a conversion is finished by the analog-to-digital converter 23b, the digital form of the analog input quantity is available on the input data trunk for tansmission through the I/O data trunk to the read-write memory 28 where such digital form is stored.

After storage of the digital form of a selected analog input quantity in read-write memory 28, the address of the next analog input to be converted is transmitted through the I/O address driver 30 and the I/O address trunk to the analog input multiplex system 23a, which selects the addressed input quantity and introduces such quantity to the input of the A/D converter 23b for conversion to its corresponding digital form.

MASTER STATION AND COMMUNICATION CHANNEL

The master station 10 preferably is a W–2800 digital computer that equipped with a line buffer unit as above described with reference to FIG. 2, and includes a memory for storing data in digital form. The master station 10 is commercially available from the Westinghouse Electric Corporation, Industry System Division, Blawnox, Pennsylvania 15238. Instruction manuals for using the master station 10 also are available from the aforesaid Industry Systems Division. Alternately the master station 10 may be a general purpose digital computer that is equipped to transmit and receive data bit serially through the channel 11, and to store received data for processing.

A communication channel 11 is a bi-directional channel, that is, one capable of carrying data in two directions. For full duplex communication, a four-wire channel is used.

RTCU PROGRAM FLOW DIAGRAM

Figure 3:
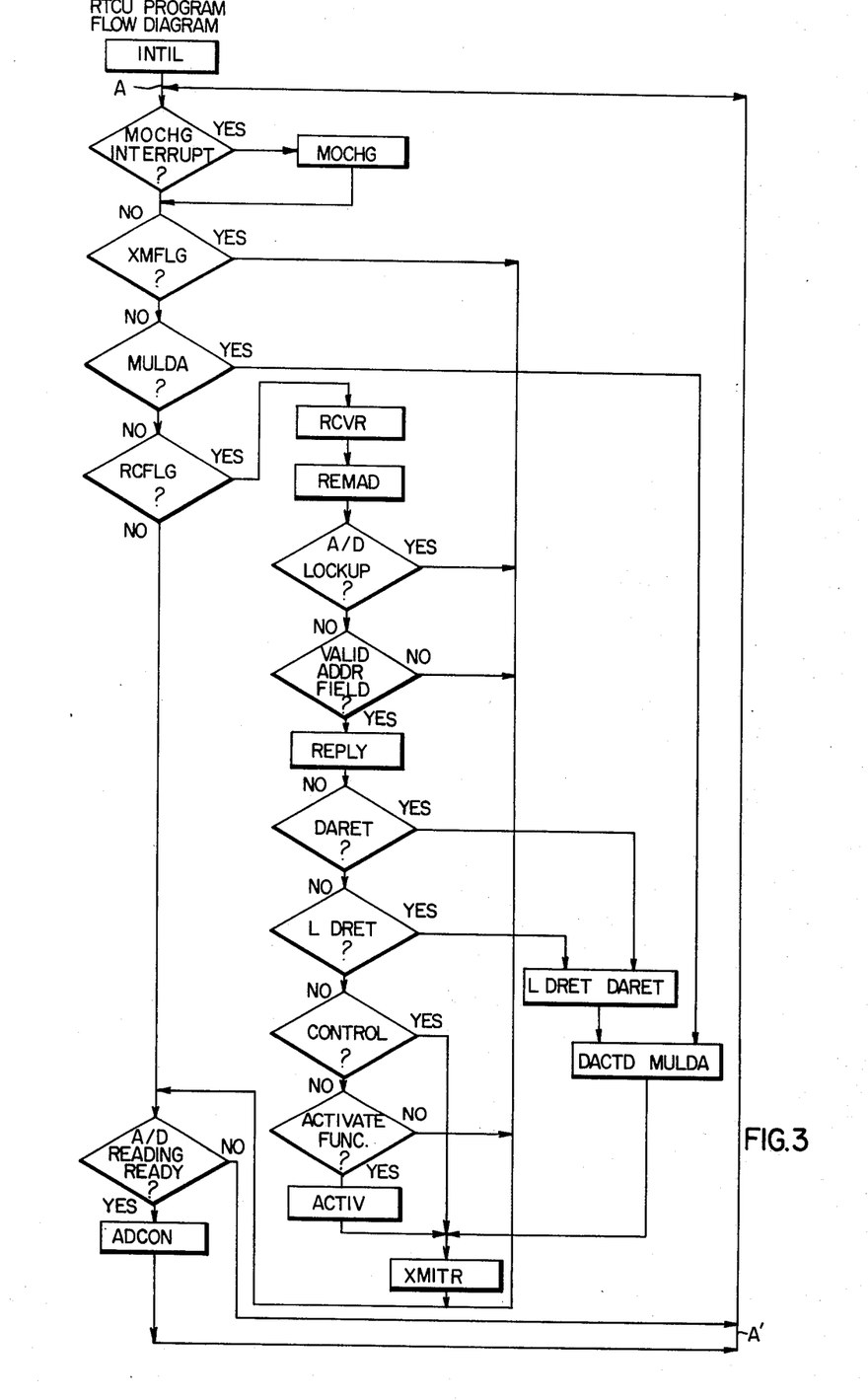
FIG. 3 schematically shows the over-all operation of the remote terminal unit in FIG. 2.

Referring now to FIG. 3, there is shown a typical RTCU program flow diagram, which illustrates the general operation of a remote terminal 12, as shown in FIG. 2. A rectangle in FIG. 3 represents a particular subroutine for which a corresponding program is stored in the read-only memory. The name of a subroutine is indicated within its respective rectangle, and a brief functional description of each subroutine is provided herebelow. A diamond in FIG. 3 represents a logical decision that is made on the basis of a corresponding program control flag. Each logical decision is identified by its respective control flag, which is described below.

The subroutine INTIL is an initialization subroutine which clears and prepares the RTCU to execute its routine program when power is first turned on. Periodically the operation of the RTCU begins at a program point A, whereafter various subroutines shown in FIG.

3 are executed, depending upon the statuses of the program control flags as subroutine execution progresses. Although various program flow paths are shown, all such paths eventually pass through a program point A', at which point the program returns directly to the point A. thus the program is executed repetitively, the time required for one execution (from program point A to program point A') being approximately two milliseconds.

It is seen that an interrupt, MOCHG, determines whether the corresponding MOCHG (momentary change and sequence of events detection subroutine) subroutine is executed during an execution of the program from the point A to the point A'. This interrupt is generated independently of the program shown in FIG. 3, a generated interrupt being indicated by the state of a particular MOCHG bit stored at a location of the read-write 28. When the MOCHG bit is set, the MOCHG subroutine is executed; otherwise, the momentary change and sequence of events detection subroutine is not executed.

The purpose of the MOCHG subroutine, as hereinafter described, is to detect by means of the contact input subsystem 24 the current status of each two-state device that is included in the associated remote station, and for which there is a respective contact input in the contact input subsystem. Thus the status of each such two-state device is detected repetitively, and the change of status of any such device is detected within a short time interval of its actual time of occurrence. As will be seen, detection of a status change within such a short time interval of its occurrence not only permits maintance of a current status table in a portion of the read-only memory 29, which table represents the most recently detected status of each two-state device, but also permits the storage of an accurate sequence of events record in anoter portion of the read-only memory 29, at times when a time series of status changes occurs at the remote station. At any time, the master station 10 may request status data that is stored in the current status table or in the sequence of events record.

The remaining program control flags and program subroutines indicated in FIG. 3 are briefly described in the accompanying table.

XMFLG - Transmit Flag - Indicates whether data in the line buffer's transmit register has been completely transmitted.

MULDA - Multiple Data - Indicates that multiple blocks of data were requested and jumps the program to couple the routine with continuous data routine.

DACTD - Continuous Data - Indicates and assists in processing multiples and continuous data until all requested have been transmitted.

RCFLG - Receive Flag - Indicates that data is available in line buffer's receiver register.

RCVR - Receive - Routine proceeds to pull data from receiver register for processing by RTCU.

REMAD - Remote Address - Checks address for following in sequence: (1) simultaneous lock-up of all A/D registers; (2) Simultaneous lock-up of all pulse accumulator registers; and (3) Valid address field for this RTCU.

REPLY - Reply - Processes received message in sequence to following routines as indicated.

DARET - Data Retrieval - If master requests data, routine sets memory starting address block and number of blocks to be retrieved.

LDRET - Release of Lock-up - Similar to data retrieval except received from master only after previously receiving A/D or pulse accumulator lock-up.

CONTROL - For messages from master requiring checkback-before-operate, this routine directs loading of transmit register of proper acknowledgement message for transmit back to the master station.

ACTIV - activate - When valid activate function is received, this generates setpoint control, reset, trip, close, etc. on point or points being activated. Latest status of points are then loaded into transmitter register for transmitting to the master station for activate acknowledge message.

A/D READING READY - Indicates A/D converter has reading ready to direct next routine flow decision.

ADCON - Analog-to-Digital Conversion - Processes A/D reading to up-date associated A/D register.

As the program is executed from the point A to the point A' a check is made to determine whether data in the transmitter register 21a of the line buffer 21 is completely transmitted and whether additional data are to be retrieved from the read-write memory 28 and loaded into the transmitter register 21a for subsequent transmission. Also, a check is made to determine whether there is received data that is available in the receiver register 21b of the line buffer 21; if such data is available, it is pulled from the receiver register for processing by the RTCU 20. Prior to reaching the program point A', a check is made during each program execution to determine whether the A/D converter 23 has completed a conversion of a selected analog input quantity; if so, the digital form of the converted analog input quantity is stored in the read-write memory 28.

Momentary Change And Sequence of Events Detection

The program shown in FIG. 3 passes through the point A repetitively. Also, the momentary change interrupt is generated repetitively and at a fixed frequency. When a generated momentary change interrupt is detected by the program after its passage through the point A, the momentary change and sequence of events detection subroutine is executed. Thus the momentary change and sequence of events detection subroutine is executed repetitively as time passes, at a frequency of execution that is determined by the frequency at which the momentary change interrupt is generated.

During a single execution of the momentary change and sequence of events detection program, the status of all two-state devices connected to the contact input subsystem 24 (see FIG. 2) is detected. Such status detection is accomplished by generating the binary address of each device group on the I/O Address Truck, in response to which the contact input subsystem 24 simultaneously detects the status of all devices and generates a detected word, in this case twelve bits long, in which the state of a bit (one or zero) represents the detected state of a corresponding two-state device. The detected status word is transmitted on the input data truck to the read-write memory 28, wherein the detected status word is stored in a temporary storage location that is used to store one detected status word at a time.

A detected status word stored in the temporary storage location is processed as hereinafter described with respect to a momentary change table a sequence of events table. Upon completion of such processing, the address of another group of devices is generated on the I/O Address Truck, the statuses of the devices of the addressed group are detected by the contact input subsystem 24, and a detected status word representing the detected statuses of the devices in the addressed group is transmitted on the input data truck to the read-write memory 28 where it is stored in the temporary storage location for subsequent processing. The statuses of the two-state devices connected to the contact input subsystem are detected a group at a time, and the detected states of the devices in a group are processed before the states of the devices in the succeeding group are detected. During an execution of the momentary change and sequence of events detection subroutine such detecting and processing continues until the status of every device that is connected to the contact input subsystem 24 is detected. The detection of the statuses of such two-state devices, one group at a time, until all groups are detected, is referred to as a scan. During a scan, the read-only memory 29 controls introduction of the device group addresses, one at a time, from the read-write memory 28, through the address trunk and the I/O Address Driver 30 to the I/O Address Trunk.

When a detected status word is stored in the temporary storage location for processing, the momentary change and sequence of events detection subroutine uses a detected status word and previously stored status data to maintain the momentary change table and to build the sequence of events table.

The momentary change table is preferably stored at successive locations of the read-write memory 28. Two successive locations of the momentary change table are associated with each group of devices which is connected to the contact input subsystem 24.

Figure 4:
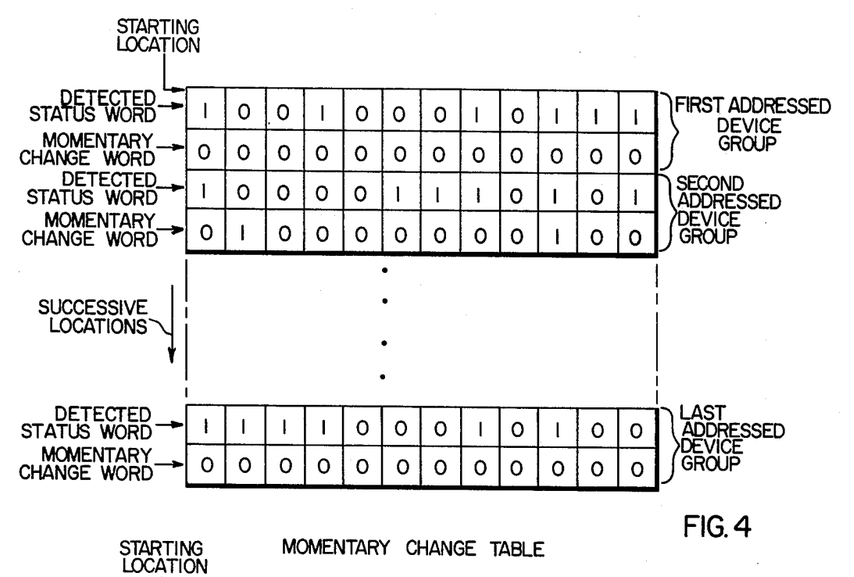
FIG. 4 shows the arrangement of a momentary change table that is stored in a remote terminal unit.

Referring now to FIG. 4, the first two locations are associated with the device group having the lowest binary address, the second two locations are associated with the device group having the next to the lowest address, and so on, until the final two locations are associated with the device group having the highest address.

As shown in FIG. 4, a first location corresponding to a particular device group stores a detected status word that was detected on a previous scan. The second location corresponding to the particular device group stores a momentary change word, which word contains a bit corresponding to each bit of the associated detected status word. When a bit of the momentary change word is in the one state, the corresponding bit of the detected status word changed since the last scan. When a bit of the momentary change word is in the zero state, the corresponding bit of the associated detected status word did not change between the present scan and the last scan.

During a single execution of the momentary change and sequence of events detection subroutine, the momentary change table is updated in light of the most recently detected states of the two-state devices that are connected to the contact input subsystem 24. Because such subroutine is executed repetitively, as above described, the momentary change table thus stores current status data relating to the two-state devices, as well as indication of the devices which changed state between successive scans. Such data is available for transmission to the master station 10 (see FIG. 1) through the channel 11 and the transmitter register 21a of the line buffer 21 (see FIG. 2) included in the local remote terminal unit 12. When such data is transmitted to the master station 10, the master station then is in receipt of the most current information relating to two-state devices at the respective local station, which information may be used for display purposes, logging purposes or alarming system operators in the area of the master station.

If a sequence of events occurs at a local station, wherein an event is defined as a detected change of a two-state device that is included in such station, and the duration of such sequence exceeds the time of a single scan of the states of the two-state devices at the station, the momentary change table stored in the remote terminal unit 12 at the local station contains only a portion of the data relating to such sequence. Because of the desirability of recording all data relating to the sequence of events at the local station, as heretofore descrived, the momentary change and sequence of events detection subroutine in addition to maintaining the momentary change table also builds a separate table relating to a sequence of events at the local station.

Figure 5:
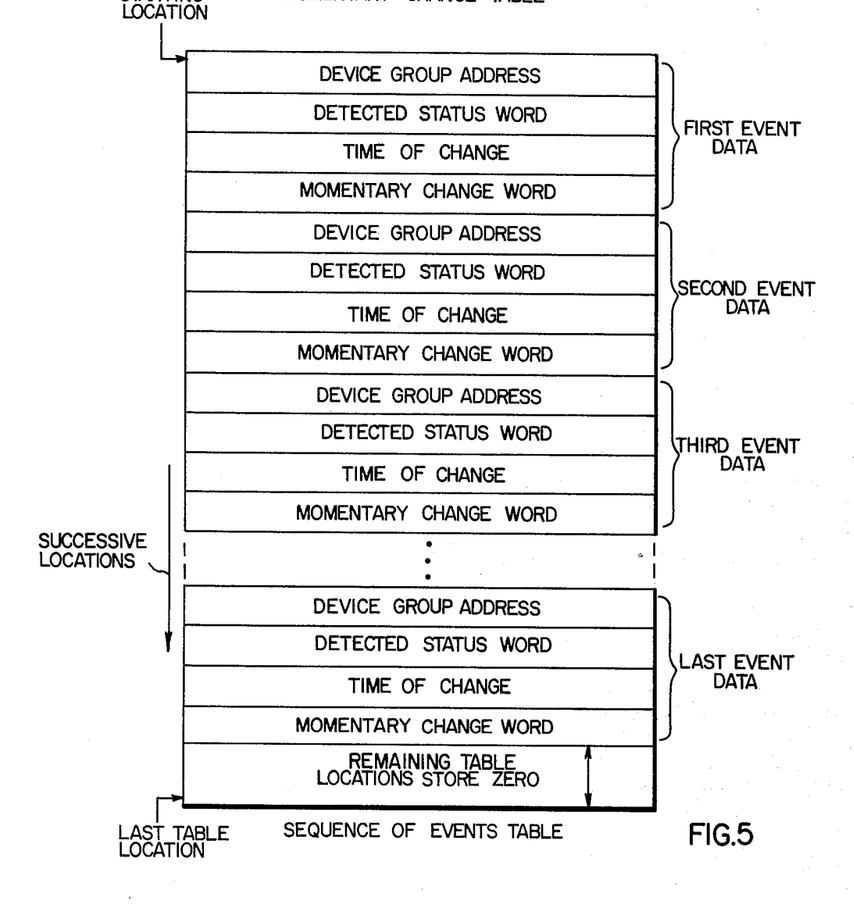
FIG. 5 shows the arrangement of a sequence of events table that is stored in a remote terminal unit.

Referring now to FIG. 5 the organization of the sequence of events table is shown. The sequence of events table is stored at successive locations of the read-write memory 28, beginning with a particular initial or starting location. Four successive locations are associated with each event, and space is allocated in the table for storage of data relating to a specified maximum number of events, in this case sixty events.

Of the four locations related to an event, the first location stores the binary address of the group of devices wherein at least one status change is detected on a scan during execution of the momentary change and sequence of events subroutine. The second location stores a detected status word that describes the detected status of the devices in the group whose address is stored in the associated first word. The third stores the time of occurrence of the detected status change that is identified by the associated first and second words. The fourth location stores a momentary change word which identifies the bits of the associated detected status word in the second location whose status changed since the past scan.

When there is no detected sequence of events, all locations of the sequence of events table store a specified number, in this case zero. During a scan of the status of the two-state devices in conjunction with execution of the momentary change and sequence of events detection subroutine, a detected change of one or more devices in a group constitutes an event, and the data relating to the address, detected status, time and momentary change word of the event are stored in the respective first, second, third and fourth locations of the sequence of events table that are associated with the first event. As the scan progresses, detection of at least one status change in a second group of devices constitutes a detected event, and the address, detected status, time and momentary change word are stored in the first, second, third and fourth locations of the sequence of events table that are associated with the second event. As hereinafter described all events detected during a single scan are accorded a single time of detection. When a single scan is finished and data relating to all events detected during the scan are stored in the sequence of events table, the identity of the location storing the fourth data word relating to the last detected event during the scan is recorded.

During subsequent executions of the momentary change and sequence of events detected subroutine, the scans of the statuses of the two-state devices connected to the contact input subsystem may detect events which did not occur previously. When such events are detected, event data relating to the detected events are stored in successive locations of the sequence of events table, beginning at the first location succeeding the last location used to store data relating to the last detected event during a previous scan. Thus events detected during successive scans are stored at successive locations of the sequence of events table in the chronological order in which the events are detected. By allocating storage capacity for a specified number of events, in this case 60, provision is made to store data related to a sequence of events at a particular local station of duration typically five to seven minutes.

Data that are stored in the sequence of events table are transmitted to the master station 10 through the transmitter register 21a including in the line buffer 21 at the remote terminal 12 and through the channel 11. The master station 10 often is busy communicating with various remote terminals; as a result, the master station 10 may not be available to receive sequence of events data from a particular remote terminal 12 as such events are detected. Storage of data relating a sequence of events at the local station, as provided by the sequence of events table in the associated remote terminal unit 12, permits the master station 10 to acquire such data when time becomes available to communicate with the particular remote terminal unit. When such time becomes available the master station 10 acquires data from the sequence of events table, until all such data is acquired, as hereinafter described. Sequence of events data that are received by the master station 10 are stored at the master station 10, for purposes of logging such data and for correlating such data with sequence of events data received from other remote terminal units, to study the propagation of a change through the system shown in FIG. 1.

In more detail with respect to an execution of the momentary change and sequence of events detection subroutine, a detected status word generated by the contact input subsystem is stored in the temporary storage location of the read-write memory 28, as heretofore described. The program then compares the detected status word stored in the temporary status location with the detected status word corresponding to the addressed device group that is stored in the momentary change table. If there is a difference, the detected status word stored in the temporary storage location is stored in the detected status location of the momentary change table corresponding to the addressed group, and the associated momentary change word is updated to indicate which bits of the newly stored detected status word changed between the present scan and the previous scan. If there is no difference, the detected status word and the momentary change word stored in the momentary change table are not changed.

Upon detection of a difference between a detected status word that is stored in the temporary storage location and the corresponding detected status word stored in the momentary change table for the addressed device group, event information is stored in the sequence of events table. The address of the device group whose detected status is represented by the detected status word in the temporary storage location is stored at the first data location for the event, the detected status word in the temporary storage location is stored at the second data location for the event, the time of the detected change is stored at the third location, and the momentary change word corresponding to the detected status word is stored at the fourth location for the event.

The momentary change interrupt is generated by a portion of the control unit 26 (see FIG. 2), which portion includes an oscillator to generate an oscillating output signal of fixed frequency, and a counter connected to count oscillations of the fixed frequency signal. The output signals of the counter comprise a binary word that represents the number of oscillations counted. The binary output word of the counter is addressable by the read-only memory 29, as if the counter were a location of the read-write memory 28. The test of the MOCHG interrupt (see FIG. 3) is performed by addressing the counter output word and determining the state of a preselected bit of the output word. If the bit is in the one state, a MOCHG interrupt is generated, and the momentary change and sequence of events detection subroutine is executed; if not, the subroutine is not executed. The fixed frequency of the oscillator is such that the preselected bit of the counter output word is in the one state preferably at four millisecond intervals, although a different interval may be used, merely by selecting an appropriate frequency of the fixed frequency signal.

The momentary change interrupt is generated at a fixed frequency; in this case, successive interrupts are separated by a time interval of four milliseconds. Upon detection of the first event, the momentary change and sequence of events detection subroutine records the time of the first event as zero time. Any other event that is detected on the same scan as the first event is also accorded time zero. After the scan in which the first event is detected, successive executions of the momentary change and sequence of events subroutine are cumulatively counted by a program counter within such subroutine, and the time accorded an event detected on a scan subsequent to a scan involving the first event is determined as the time interval between successive momentary change interrupts multiplied by the number of executions of the subroutine since detection of the first event. Thus the time accorded an event detected during the third subroutine execution following the scan involving the detection of the first event is twelve milliseconds, i.e. the four millisecond interval multiplied by the number of subroutine executions subsequent to the first event, which is three. Thus the time assigned to events detected on a single scan is the same, and more particularly is the lapsed time from the scan during which the first event is detected. By measuring elapsed time in terms of subroutine execution number, in response to an interrupt generated at a fixed frequency, the time separation of events at a local station (see FIG. 2) is measured conveniently and inexpensively without requiring a separate real time clock to measure absolute time. Further, storage of elapsed time for an event, as in the sequence of events table, is more efficient and less costly than storage of absolute time of an event, which requires more storage space than elaspsed time.

It is understood that in place of the elapsed time measurement, as is above described, a clock which measures real time and generates digital output signals representative of the measured time may be connected to provide such signals to the input data trunk (see FIG. 2). In such case, upon detection of an event, the I/O Address Trunk is used to address the real time clock, and the clock output signals representing real time are transmitted through the input data trunk to the remote terminal control unit 20, to permit storage of the measured real time in the sequence of events table. In comparison with elaspsed time, as above described, measurement of real time requires the additional clock and additional storage space in the sequence of events table in order to store absolute time.

At the end of each execution, the momentary change and sequence of events subroutine records a pointer, which pointer indicates that location of the sequence of events table which is used to store the fourth (and last) word related to the last event detected during the scan just completed. Thus the first data word related to the next event detected, if there be one, is stored at the location of the sequence of events table immediately following the data relating to the most recently detected event. During execution of the momentary change and sequence of events subroutine, the pointer is moved as event data is stored in the sequence of events table. The pointer is advanced to the succeeding location of the sequence of events table each time a word of event data is stored in the table, so that the pointer always specifies the next unused table location. Because the starting location of the sequence of events table is fixed, and the table is stored in successive locations of the read-write memory 28, the first location not used to store event data may be established from the starting location of the table and the total number of storage locations thus far.

During an execution of the momentary change and sequence of events detection subroutine a change of status flag is raised upon detection of the first two-state device whose status has changed from the status detected during the previous scan. The purpose of the change of status flag is to inform the master station 10 (see FIG. 1) that at least one event is stored in the sequence of events of events table, and that a change of state has been detected. The change of status flag is represented by the state of a specified bit, for example, the third bit, of a word that is transmitted from the remote terminal 12 to the master station 10 through the channel 11. When such second bit is in the one state, the master station 10 is informed upon receipt of such bit that at least one change of state has been detected at the local station 12. The master station 10 routinely polls the remote terminals 12 to send various data to the master station; the change of status flag is conveyed by the second bit of the first word that is sent by the remote terminal 12 to the master station 10 after the remote terminal is polled.

Upon receipt of the change of status flag, the master station 10, which typically includes a real time clock to generate digital signals representative of measured absolute time, may record the measured absolute time at which the change of status flag is received, together with the identity of the remote station 12 which sent the flag. Thus, in event the sequence of events data subsequently is received from such remote terminal 12, the elapsed time associated with each event, as above described, is convertible to real time within the master station 10, since elapsed time at the local station is measured from the first event, whose occurrence in time is recorded by the master station 10.

Upon detection of a second event at the local station, if there be one, a sequence of events flag is raised by the remote terminal 12 and sent to the master station 10, to notify the master station that there is more than one event stored in the sequence of events table in the respective remote terminal 12. The sequence of events flag is transmitted to the master station 10 by a particular bit, in this case the third bit, of any word that is sent by the remote terminal 12 to the master station 10 through the channel 11. When such bit is in the one state, the master station 10, upon receipt of the bit, is informed that data relating to at least two events is stored in the sequence of events table at the remote terminal 12.

If a change of status flag is received by the master station 10 from a remote terminal 12, but a sequence of events flag is not received from the remote terminal 12, the master station 10 is aware that only one event has occurred at the local station, and not a sequence of events, whereby the master station does not request the remote terminal 12 to send data from its sequence of events table, as the table holds data for only a single event. Without the information conveyed by the sequence of events flag, the master station 10 must request data from the sequence of events table, to discover that no sequence has occurred. Such a request wastefully utilizes channel communication time and remote terminal time, as well as processing time at the master station 10, to discover that no sequence of events occurred at the remote terminal 12. Thus the sequence of events flag conserves processing time of the master station 10, which typically is busy requesting and receiving data from the various remote terminals, processing received data, as well as determining and sending information to the remote terminals 12 relating to control actions to be taken by the remote terminals through their respective contact output subsystems (see FIG. 2).

Upon receipt of a sequence of events flag from a remote terminal 12 and subsequent receipt of a change of status flag from that terminal, the master station 10 need not request and process sequence of events data from the remote terminal 12 immediately; rather, the master station 10 may request data at a later time, due to other functions currently being performed by the master station 10 which render it too busy to request and process sequence of events data from the remote terminal 12 immediately following receipt of the sequence of events flag. While the master station 10 is busy, the remote terminal 12 continues to detect events and to store event data in its sequence of events table, which is advantageously large enough to store event data for a number of events, in this case 60, that typically occur over a five to seven minute time interval. When time is available for the master station 10 to request and process sequence of events data from the remote terminal 12, such data is cumulatively stored in the sequence of events table, as heretofore described.

To retrieve sequence of events data that is stored in the sequence of events table of a remote terminal 12, the master station 10 transmits a request for such data through the channel 11. Preferably such a request specifies a fixed number of words of data to be retrieved from successive locations of the sequence of events table, and the location of the first word. When such a request is received by the remote terminal 12, the requested data is transferred to the transmitter register 12a included in the line buffer unit 21 of the remote terminal 12, from which transmitter register 21a the requested data is transmitted bit serially to the master station 10.

The first request for sequence of events data from a remote terminal 12 is for a fixed number of words stored at successive locations of the sequence of events table, beginning with the starting location of the table. When the data first requested is received by the master station 10, the master station determines whether any data word is zero. If a data word is zero, there is no more event data in the sequence of events table, as hereinafter described. In such case, the master station 10 transmits no further request for sequence of events data and begins processing the data received. Thus the master station 10 is advantageously relieved of the necessity of requesting an additional block of event data, communicating with the remote terminal 12, and utilizing valuable time to discover that the subsequent block of data contains no additional event information.

If the first received block of event data contains no zero, the master station requests a second block of data, which comprises data stored at a fixed number of successive locations of the sequence of events table immediately following the first block. If the second block contains no zero, a third block is requested; if the second block does contain a zero, a third block is not requested. Generally an additional data block is requested from the sequence of events table until the most recently received block contains a zero, whereupon no further data is requested. Such procedure relieves the master station 10 of a necessity of communicating with a remote terminal 12 to discover that an additional block contains no information, which communication requires valuable processing time on the part of the master station 10. Such relief increases the amount of time available for the master station 10 to communicate with other remote terminals.

As heretofore described, events are stored in the sequence of events table in chronological order, the earliest event being stored at the first set of four successive locations of the table, beginning with the starting location, and subsequent events are stored at succeeding locations of the table. As above described events data is retrieved from the sequence of events table in blocks, each block comprising data stored at a fixed number of locations of the table. Thus event data is retrieved from the sequence of events table and transmitted to the master station 10 in the chronological order in which the events described by such data occurred. When the master station 10 receives such data in chronological order, processing within the master station 10 for purposes of storing the data, converting elapsed time to real time, as above discussed, or comparing in time a sequence of events from a first remote terminal 12 with a sequence of events from another remote terminal 12, is advantageously simplified, for the master station 10 spends no processing time to sort the received data to put the data in chronological order. This advantageously reduces processing time on the part of the master station 10 and correspondingly increases the amount of time available to the master station 10 for communicating with other remote terminals.

Upon receipt of the first block of event data from a remote terminal 12 that contains a zero, the master station 10 generates a clear memory flag that is transmitted through the channel 11 to the respective remote terminal 12. Such flag is conveyed by a specified state of a particular bit of the next word that is transmitted from the master station 10 to the remote terminal 12. When the bit corresponding to the clear memory flag is received by the remote terminal 12, a zero is stored in every location of the sequence of events table, to initialize such table for storage of data relating to a subsequently detected sequence of events.

GENERAL FLOWCHART

Figure 6:
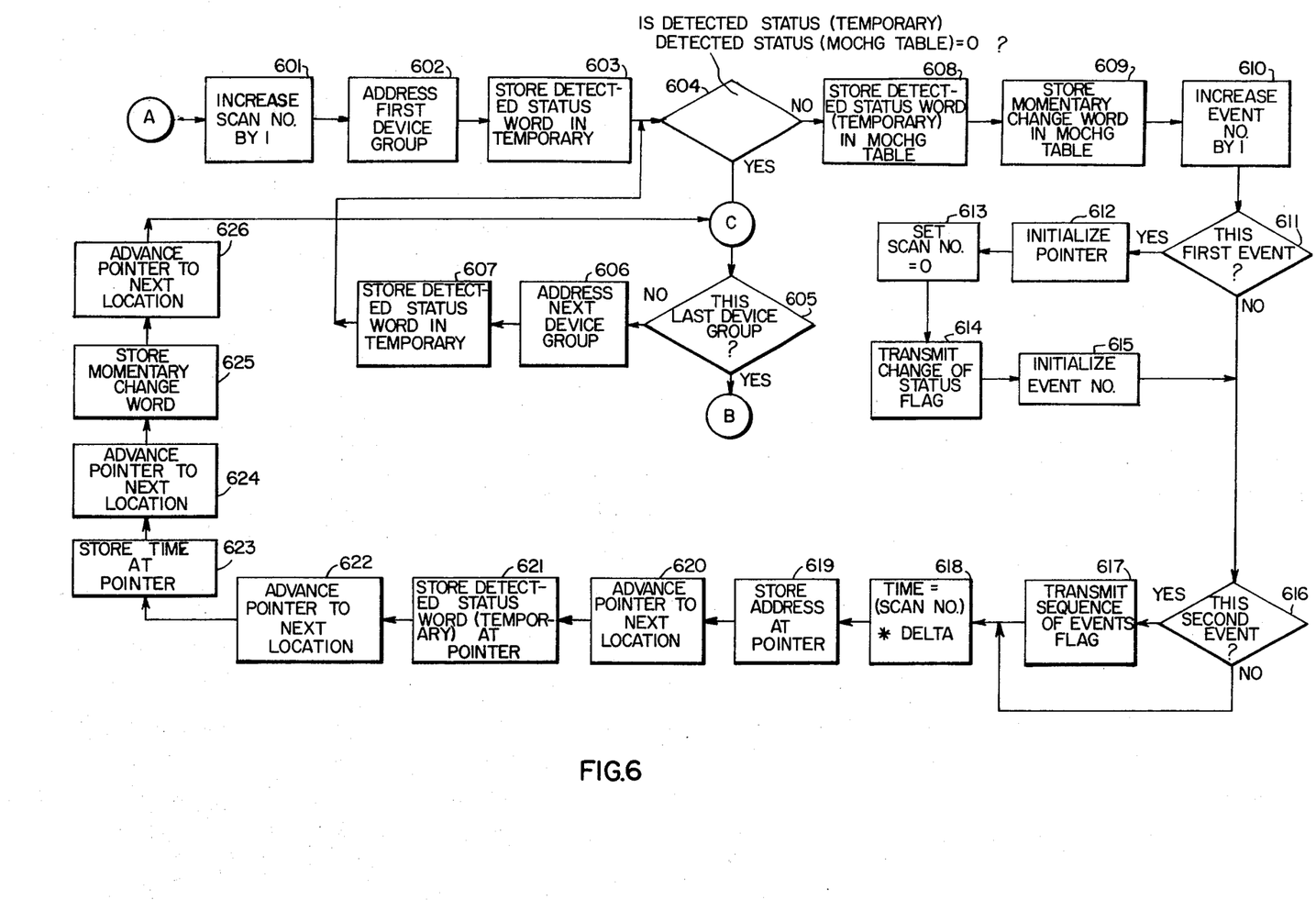
FIG. 6 illustrates in general a momentary change and sequence of events detection subroutine that is executed by a remote terminal unit.

Referring to FIG. 6 there is shown a general flowchart of the momentary change and sequence of events detection subroutine.

The subroutine begins at a point A. At block 601, SCAN NO is increased by one (decimal); as will be seen, SCAN NO is used to calculate the lapsed time of an event. At block 602, the first device group is addressed through the I/O address driver 30 and the I/O Address Trunk (see FIG. 2). At block 603, the detected status word as transmitted by the input data trunk from the contact input subsystem 24 is stored at the temporary location of the read-write memory 28.

At block 604, the detected status word stored at the temporary location is compared with the detected status word for the addressed group (in this case the first addressed group) as stored in the momentary change table (see FIG. 4). If there is no difference, i.e. there is no status change, and thus no event, the program flows through a program point C to blcok 605, to determine whether all device groups are addressed for the present scan. When all device groups are addressed, the present scan is finished, and the program flows to a program point B, which is the end of the subroutine.

If not all device groups are addressed during the present scan, the program flows to block 606 wherein the next device group is addressed through the I/O address driver 30 and the I/O Address Trunk (see FIG. 2). The detected status word for the addressed group is stored in the temporary storage location of the read-write memory 28, whereupon the program returns to block 604 to determine whether there is a difference between the detected status word in temporary storage and the detected status word stored in the momentary change table (see FIG. 4) for the presently addressed group.

At block 604, if the above-described difference is not zero, a status change (event) has occurred between the present scan and the past scan, involving at least one device included in the presently addressed group. In such case, the program passes to block 608 at which block the detected status word in the temporary location is stored in the detected status location of the momentary change table corresponding to the currently addressed device group. At block 609, the momentary change word, which indicates the particular bits of the associated detected status word that underwent change between the present scan and the last scan, is stored at the momentary change word location of the momentary change table corresponding to the currently addressed device group.

At block 610, the EVENT NO, which is a count of the number of events stored in the sequence of events table (see FIG. 5) is increased by one (decimal). At block 611 it is determined whether the currently detected event is the first such event, which determination is made by checking whether the starting location of the sequence of events table (see FIG. 5) contains zero. If so, the currently detected event is the first event. If not, the currently detected event is not the first event. When events are detected subsequent to the first event it will be appreciated that the EVENT NO shows that the detected event is not the first.

When the detected event is the first, block 612 initializes the pointer to the starting location of the sequence of events table. Then block 613 initializes the SCAN NO at zero (decimal), following which block 614 raises the previously described change of status flag, which is transmitted to the transmitter register 21A of the line buffer unit 21. From the line buffer unit 21 the change of status flag is transmitted through the channel 11 to the master station 10 as heretofore described. Thereafter block 615 initializes the EVENT NO at one (decimal).

If the currently detected event is not the first, or if it is the first and the EVENT NO is initialized, the program passes to block 615 to determine whether the currently detected event is the second event. Since block 610 increases the EVENT NO by one (decimal) upon each detected event, the determination of block 616 is made by checking the EVENT NO; if the EVENT NO is two (decimal), i.e. the detected event is the second event, then the previously described sequence of events flag is raised and placed in the transmitter register 21A of the line buffer 21 (see FIG. 2) which transmits the sequence of events flag through the channel 11 to the master station 10.

If the currently detected event is not the second, or if such event is the second and the sequence of events flag is raised, the program passes to block 618, which calculates elapsed time as the product of SCAN NO with DELTA, which is the time interval between successive MOCHG interrupts. At block 619 the address of the currently addressed device group is stored at the location of the sequence of events table (see FIG. 5) specified by the pointer. The pointer is advanced to the next location of the sequence of events table at block 620, whereupon block 621 stores the detected status word stored at the previously described temporary location in the location of the sequence of events table now specified by the pointer.

Block 622 again advances the pointer to the succeeding location of the sequence of events table, whereafter block 623 stores the calculated elapsed time at the location specified by the pointer. Then block 624 advances the pointer to the next location of the sequence of events table, and block 625 stores a momentary change word at the location specified by the pointer, such momentary change word indicating those bits of the associated detected status word which changed between the past scan and the present scan. Thereafter, block 626 moves the pointer to the next location of the sequence of events table, i.e. to the first such location that will be used to store the address of the device group associated with the next detected event if there be one. The program then passes to point C to determine whether, as previously discussed, all of the device groups are addressed during the present scan.

During a single scan, the program repetitively returns to the point C until all device groups are addressed, and the scan is finished. If no event is detected upon return to point C and addressing the next device group, block 604 returns the program immediately to point C. If the next addressed device group is associated with a status change, then the block 604 sends the program to block 608 and succeeding blocks which refresh the momentary change table in light of the currently detected event, and store event data in the sequence of events table, prior to returning to the point C.

Because each new scan begins at point A, it is seen that all events detected on a particular scan are assigned the same elapsed time, and that the elapsed time is increased with each succeeding scan by the blocks 601 and 618. Furthermore, since SCAN NO is set to zero upon occurrence of the first event, it is evident that the elapsed time recorded is with respect to that scan during which the first event is detected.

APPENDIX I

REDAC 70 Flowchart and Listing

Figure 7A:
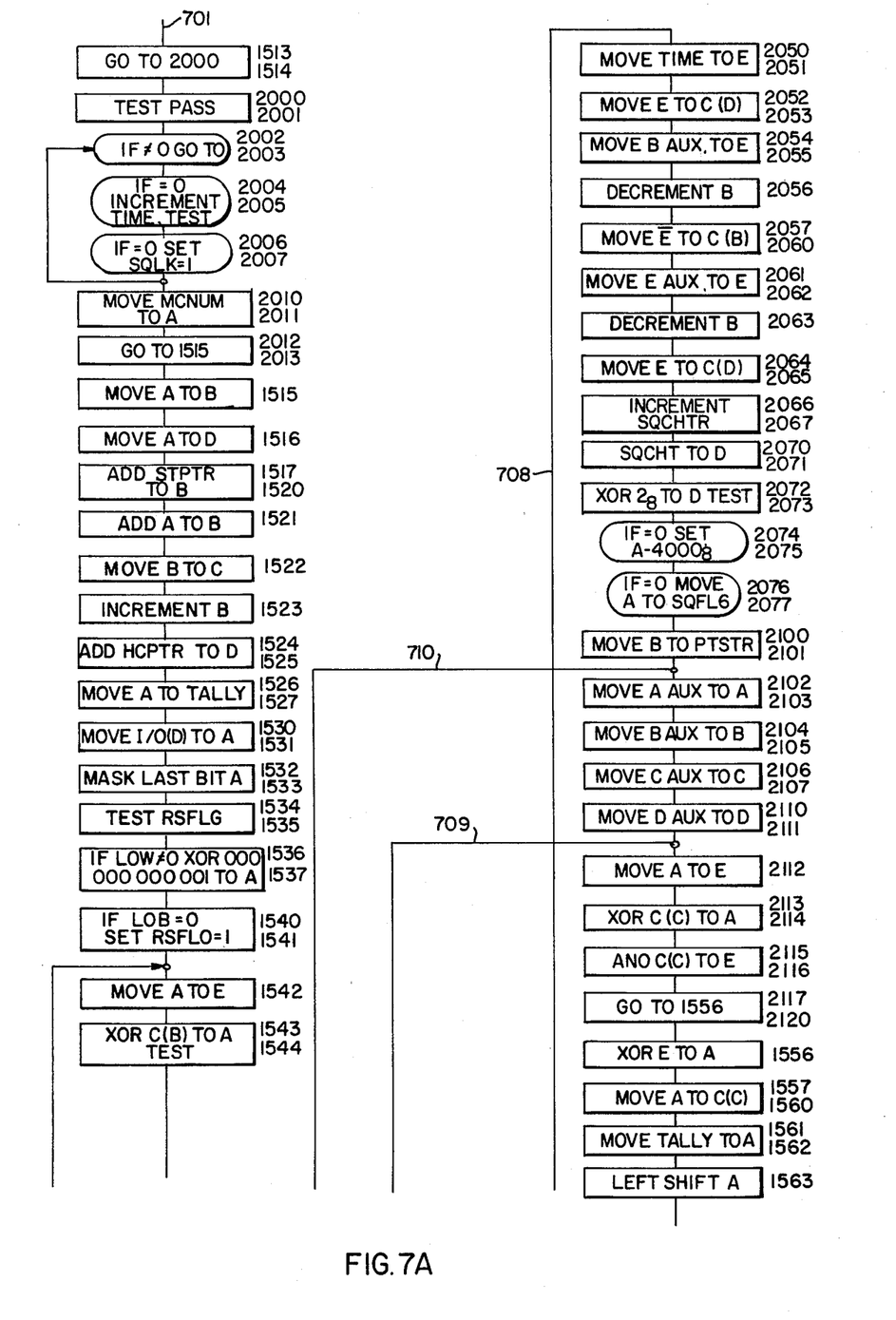
FIG. 7A and 7B show a detailed flowchart for the momentary change and sequence of events detection subroutine.
Figure 7B:
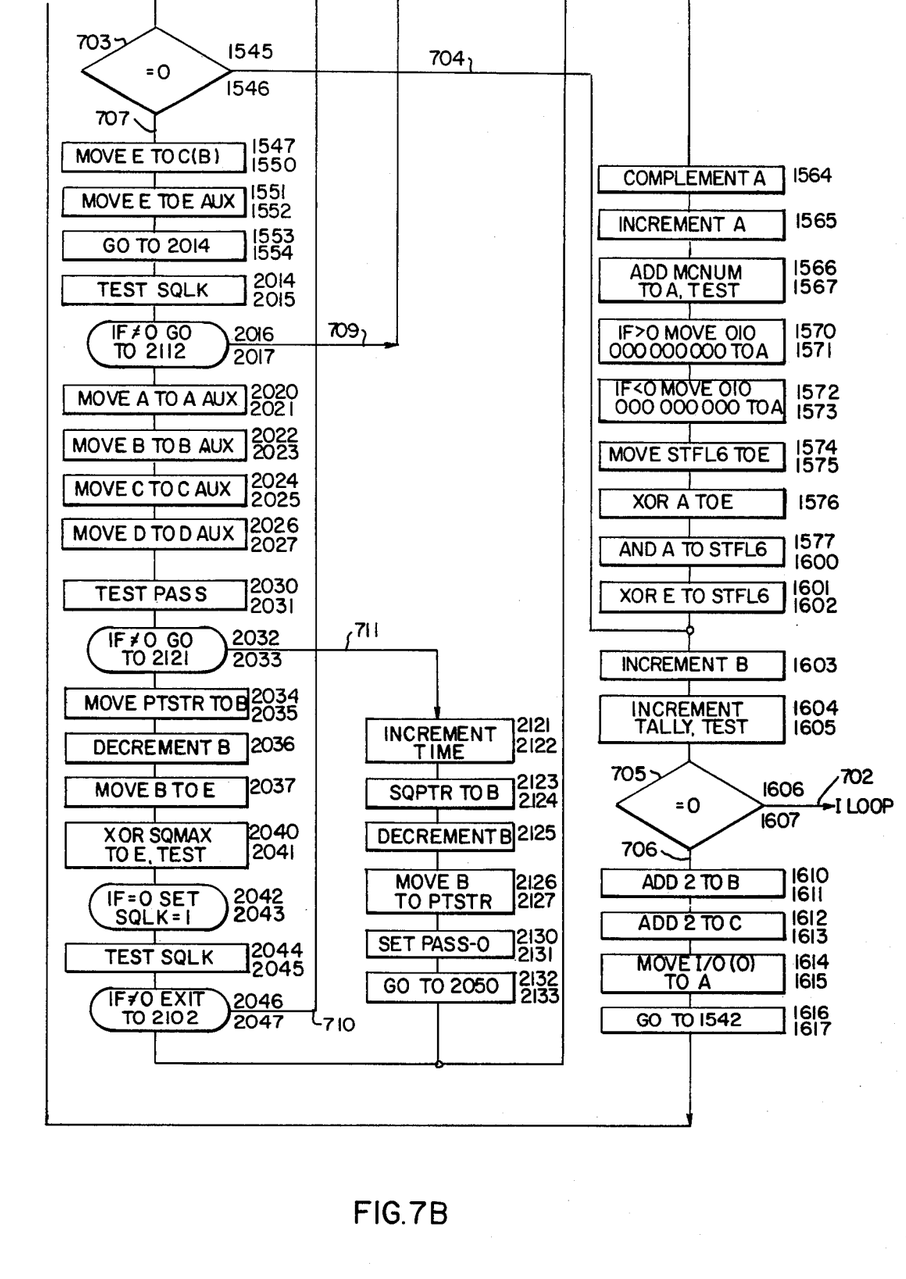

Referring now to 7A and 7B there is shown a flowchart of the momentary change and sequence of events detection subroutine as installed in a Redac 70 remote terminal unit 12.

A program point 701 (FIG. 7A) is the beginning of the subroutine, and a program point 702 is the end of the subroutine; these points correspond respectively to the program points A and B (see FIG. 6). Also a test 703 (FIG. 7B), to determine whether there are any changes of status in a currently detected status word, corresponds to the block 604 shown in FIG. 6. Furthermore a branch 704 corresponds to the branch, or program point C, which is shown in FIG. 6.

Generally, between the points 701 and 703 the program computes elapsed time in the manner previously described, and compares a detected status word that is stored in the temporary storage location with a corresponding detected status word that is stored in the momentary change table. At branch point 703, if there is no difference, the program pursues the branch 704 to instructions which include a test 705 to determine whether all device groups are addressed during the present scan. If so, the subroutine is finished and exits at the point 702. If not, the subroutine pursues a branch 706 to determine the address of the next device group to be addressed during the present scan. It will be appreciated that the test 705 corresponds to the block 605 shown in FIG. 6.

If a status change is detected at the test 703, the program pursues a branch 707 which includes instructions later briefly described, to a branch 708 and thereupon executes instructions to update the momentary change table and to enter event data in the sequence of events table as previously described. Then the program reaches the test 705, to determine whether any additional device groups need be addressed during the present scan.

In more detail with respect to FIGS. 7A and 7B, the numbers associated with a block designate the locations of the read-only memory 29 (see FIG. 2) that store instructions to implement the operations of the corresponding block. Included hereinbelow is a listing of the contents of typical locations of the read-only memory 29 that appear in FIGS. 7A and 7B. The read-only memory 29 comprises memory chips that are commercially available from the Intersil Corporation, which also supplies a machine to install a given word, content, or instruction in a particular location of a read-only memory chip. A chip is placed in the machine, the location is specified to the machine, and the content of the location is manually entered to the machine, which stores the stated content at the selected word. Whenever a chip is fully programmed by such manual storage of the program content, the programmed chip may be copied automatically by the machine.

With further reference to FIGS. 7A and 7B locations 2002 to 2007 store instructions to calculate elapsed time as heretofore described, for all scans succeeding that scan during which the first event occurs. The program also includes two useful features that are not shown in FIG. 6. Instructions at locations 2006 and 2007 effect a time lockout, in event that the calculated elapsed time is so great that it overflows the size of a location of the read-write memory 28 (see FIG. 2). Such action is required only in the event a sequence of events occurs over an unusually long time interval; usually such action is not taken, and the calculated elapsed time from the scan involving the first event is stored as calculated. During time lockout the elapsed time is held at the greatest value that can be stored in a location of the read-writer memory 28. A second feature of the program shown in FIGS. 7A and 7B is effected by instructions stored at locations 2034 to 2047, which permit no additional storage of sequence data in the sequence of events table (file lockout) when that table is filled, i.e. when all locations of the table are filled with data relating to events already detected and recorded. By prohibiting additional storage of data under such circumstance, there is no possibility of storing sequence data in portions of the read-write memory 28 that are allocated for storage of data other than sequence data. A test at locations 2016 and 2017 sends the program on a branch 709 when there is a time lockout; when there is a file lockout, a test at locations 2046 and 2047 sends the program on a branch 710. Under file lockout, no sequence data is stored in the sequence of events table. Under time lockout, sequence data is stored in such table, but the elapsed time is held at a fixed value, as above described. In the event of either such lockout, the program still updates the momentary change table as previously described.

At times when the first event is detected, the program pursues a branch 711 to a set of instructions which initialize the counting of elapsed time. At other times, the counting of elapsed time is performed by instructions stored at locations 2002 to 2007.

Shown herebelow are the contents of typical locations of the read-only memory 29 that are used to store instructions related to the program shown in FIGS. 7A and 7B. A number which appears under the heading ADDR specifies the address of a particular location of the read-only memory 29; adjacent such number there appears the binary word, or content, which is stored at the specified location. Address numbers which appear below correspond to those shown in FIGS. 7A and 7B. For example, the contents of locations 1513 and 1514 below are associated with the program step GO TO 2000, which appears after the point 701 in FIG. 7A. Locations having addresses from 1500 to 1577 are shown in Table 1; those having addresses from 1600 to 1677 are shown in Table 2; and those from 2100 to 2177 are shown in Table 3.

TABLE 1

| ADDR | CONTENTS | ADDR | CONTENTS |
| --- | --- | --- | --- |
| 1500 | 1000111111111000 | 1540 | 1111101101011111 |
| 1501 | 1111101011101111 | 1541 | 1110000000111000 |
| 1502 | 1110110011001101 | 1542 | 1101101111000111 |
| 1503 | 1111111101011111 | 1543 | 0010111111111011 |
| 1504 | 1111111111110100 | 1544 | 1111111111111101 |
| 1505 | 1111101011101111 | 1545 | 1111101011101111 |
| 1506 | 1111110101101100 | 1546 | 1101110001111101 |
| 1507 | 1011101111111100 | 1547 | 1011101111011000 |
| 1510 | 1111111111110011 | 1550 | 1111111111111101 |
| 1511 | 1111101011101111 | 1551 | 1111101111011000 |
| 1512 | 1111110011000111 | 1552 | 1111111111000110 |
| 1513 | 1111101011101111 | 1553 | 1111101011101111 |
| 1514 | 1111110000000000 | 1554 | 1111101111110100 |
| 1515 | 1101101111110111 | 1555 | 1111111111111100 |
| 1516 | 1101101111001111 | 1556 | 1100111111111000 |
| 1517 | 1111111111110011 | 1557 | 1011101111011111 |
| 1520 | 1111110111111000 | 1560 | 1111111111111100 |
| 1521 | 1101111111110111 | 1561 | 1111101111111011 |
| 1522 | 1101101111010110 | 1562 | 1111111111110001 |
| 1523 | 1101111101110111 | 1563 | 1101111111111111 |
| 1524 | 1111111111001011 | 1564 | 1101101010111111 |
| 1525 | 1111101111110111 | 1565 | 1101111110111111 |
| 1526 | 1111101111011111 | 1566 | 0111111111111011 |
| 1527 | 1111111111110001 | 1567 | 1111110111111001 |
| 1530 | 1011101111111100 | 1570 | 1111101011111111 |
| 1531 | 1111111111111011 | 1571 | 1011101111111111 |
| 1532 | 1111011011111111 | 1572 | 1111101011111111 |
| 1533 | 1111000000000001 | 1573 | 1001110111111111 |
| 1534 | 0111110111011111 | 1574 | 1111101111000011 |
| 1535 | 1111000000111000 | 1575 | 1111111111110111 |
| 1536 | 1110111011111111 | 1576 | 1100111111000111 |
| 1537 | 1000111111111110 | 1577 | 1111011111011111 |

TABLE 2

| ADDR | CONTENTS | ADDR | CONTENTS |
| --- | --- | --- | --- |
| 1600 | 1101111101001111 | 1640 | 1111111111111001 |
| 1601 | 0111111101011111 | 1641 | 1111101111111011 |
| 1602 | 1111111111110001 | 1642 | 1111110111110011 |
| 1603 | 1111101011101111 | 1643 | 1111101111011111 |
| 1604 | 1101101111000101 | 1644 | 1111111111111000 |
| 1605 | 1101111101110111 | 1645 | 1111101101011111 |
| 1606 | 1101111101010111 | 1646 | 1111000000111010 |
| 1607 | 1011101111111100 | 1647 | 1011101111010011 |
| 1610 | 1111111111111011 | 1650 | 1111111111111000 |
| 1611 | 1111101011101111 | 1651 | 1111101011111111 |
| 1612 | 1111110010011001 | 1652 | 1111000000000101 |
| 1613 | 1111111111111111 | 1653 | 1111101111011111 |
| 1614 | 1111111111111111 | 1654 | 1111111111110000 |
| 1615 | 1111111111111111 | 1655 | 1011101111001100 |
| 1616 | 1111111111111111 | 1656 | 1111111111111001 |
| 1617 | 1111111111111111 | 1657 | 1111100110111111 |
| 1620 | 0111110111011111 | 1660 | 1111000000111001 |
| 1621 | 1111000000111110 | 1661 | 0101110111001111 |
| 1622 | 1111101101011111 | 1662 | 1101101000001001 |

TABLE 2-continued

| ADDR | CONTENTS | | |
|---|---|---|---|
| 1623 | 1000000000111011 | 1663 | 1111101011101111 |
| 1624 | 1111101111111011 | 1664 | 1000110001000011 |
| 1625 | 1111110111110110 | 1665 | 0101110111001111 |
| 1626 | 1101101111110111 | 1666 | 1111101011101111 |
| 1627 | 1111111111110011 | 1667 | 1110110001000011 |
| 1630 | 1111110111110101 | 1670 | 1111101101011111 |
| 1631 | 1111111111110111 | 1671 | 1111000000111001 |
| 1632 | 1000111111111111 | 1672 | 0101110111010111 |
| 1633 | 1111101110111111 | 1673 | 1011111101011111 |
| 1634 | 1111111111110001 | 1674 | 1110111111111101 |
| 1635 | 1111101111111011 | 1675 | 0111110111011111 |
| 1636 | 1111110111110100 | 1676 | 1111000000111110 |
| 1637 | 1111101111011111 | 1677 | 1111101011101111 |

TABLE 3

| ADDR | | | |
|---|---|---|---|
| 2100 | 1111101111011110 | 2140 | 1111110111101101 |
| 2101 | 1111111111000001 | 2141 | 1011100111011111 |
| 2102 | 1111101111111011 | 2142 | 1111111111111101 |
| 2103 | 1111111111001010 | 2143 | 1101110010110111 |
| 2104 | 1111101111110011 | 2144 | 0100111111000110 |
| 2105 | 1111111111001001 | 2145 | 1111101011101111 |
| 2106 | 1111101111010011 | 2146 | 1100101110100001 |
| 2107 | 1111111111001000 | 2147 | 1111110011101111 |
| 2110 | 1111101111001011 | 2150 | 1111111111000000 |
| 2111 | 1111111111000111 | 2151 | 1111100111011111 |
| 2112 | 1101101111000111 | 2152 | 1111111111000010 |
| 2113 | 1010111111111011 | 2153 | 1111100111011111 |
| 2114 | 1111111111111100 | 2154 | 1111111111000100 |
| 2115 | 1011011111000011 | 2155 | 1111101101011111 |
| 2116 | 1111111111111100 | 2156 | 1111111111000101 |
| 2117 | 1111101011101111 | 2157 | 1111101011101111 |
| 2120 | 1111110010010010 | 2160 | 1111110101101100 |
| 2121 | 1111111101011111 | 2161 | 1111111111111111 |
| 2122 | 1111111111000000 | 2162 | 1111111111111111 |
| 2123 | 1111101111110011 | 2163 | 1111111111111111 |
| 2124 | 1111110111101110 | 2164 | 1111111111111111 |
| 2125 | 1101110010110111 | 2165 | 1111111111111111 |
| 2126 | 1111101111011110 | 2166 | 1111111111111111 |
| 2127 | 1111111111000001 | 2167 | 1111111111111111 |
| 2130 | 1111100111011111 | 2170 | 1111111111111111 |
| 2131 | 1111111111000101 | 2171 | 1111111111111111 |
| 2132 | 1111101011101111 | 2172 | 1111111111111111 |
| 2133 | 1111101111011000 | 2173 | 1111111111111111 |
| 2134 | 1111101111110011 | 2174 | 1111111111111111 |
| 2135 | 1111110111101110 | 2175 | 1111111111111111 |
| 2136 | 1101110010110111 | 2176 | 1111111111111111 |
| 2137 | 1111101111000011 | 2177 | 1111111111111111 |

It is claimed:

1. System apparatus for detecting and recording a time sequence of status changes of a plurality of two-state devices at each of a plurality of locations, said apparatus comprising:
   a remote terminal unit for each of the locations,
   means for processing and recording data at a master station in response to data signals received from said remote terminals,
   means for transmitting data signals between said remote terminals and said master station under predetermined control conditions,
   each of said terminals including first means for periodically detecting the state of each device associated therewith,
   second means for comparing the currently detected state of each associated device with the previously detected state of the associated device to detect a difference between such state,
   third means for storing the identity and the currently detected state of an associated device when such state differs from the previously detected state, and for storing a representation of the elapsed time at which the difference is detected relative to a reference time point, and
   said master station means including means for recording absolute time to enable correlation of transmitted elapsed time data from said remote terminals.

2. Apparatus according to claim 1 wherein each remote terminal unit is associated with a power system substation.

3. Apparatus according to claim 1 wherein the two-state devices at each remote terminal are grouped, each group having a predetermined number of the devices, and the states of the devices in a group are detected simultaneously.

4. Apparatus according to claim 3, wherein said third means includes means for representing the detected states of the devices of a group by a detected status word, such word having a number of bits equal to the number of devices in the group, each of which bits represents the detected state of a corresponding one of the devices of the group.

5. Apparatus according to claim 4 wherein there is a plurality of device groups with each device group having a corresponding group address.

6. Apparatus according to claim 5 wherein said third means includes means for detecting the states of the devices a group at a time.

7. Apparatus according to claim 4 wherein said third means includes means for holding a detected status word in a temporary storage location and means for comparing the detected status word with a stored previously detected status word corresponding to the addressed device group.

8. Apparatus according to claim 1 wherein the elapsed time at each terminal is measured from the time of detection of the first change of state of a device associated with the terminal.

9. Apparatus for detecting and recording status changes of a plurality of two-state devices, wherein each device is a member of a respective device group having a unique address and including a predetermined number of devices, comprising:

means for periodically detecting the states of the devices of each group, wherein the detected states are represented by a detected status word having a bit corresponding to each device of the group, storage means for recording a previously detected status word corresponding to each group of devices, means for comparing each detected status word representing the currently detected states of the devices of a group with the corresponding detected status word in said storage means to detect a difference between such words, and means for storing the detected status word representing the currently detected status of the devices of a group in storage means when a difference is detected.

10. Apparatus according to claim 9 wherein the states of the devices are detected one group at a time in succession, and a detected status word representing the currently detected states of a group of devices is stored at a temporary storage location included in said storage means until the states of the devices in the succeeding group are detected.

11. Apparatus according to claim 9 wherein said means for comparing further generates a momentary change word associated with each detected status word that is recorded in said storage means, such momentary change word indicating those bits of the associated detected status word which differ from the corresponding bits of the previously detected status word, and said means for storing stores each momentary change word in said storage means.

12. Apparatus according to claim 11 wherein said storage means includes first and second preselected locations associated with each group of devices, a detected status word being recorded at the first location, and the associated momentary change word being recorded at the second location.

13. Apparatus according to claim 12 wherein said storage means further includes storage locations separate from the first and second locations associated with each device group, and upon occurrence of a detected change of state of at least one device of a group said means for storing records in such separate locations the address, the detected status word, and the momentary change word associated with the device group, with the elapsed time at which the change is detected relative to a reference point in time.

14. Apparatus according to claim 7 wherein said means for comparing at each terminal also generates a momentary change word associated with a detected status word to indicate which bits of the status word differ from the corresponding bits of the previously detected status word, and said third means stores the momentary change word associated with a stored detected status word.

15. Apparatus according to claim 14 wherein data relating to detected changes of state are stored at successive storage locations at each terminal, in the chronological order with which the status changes are detected.

16. Apparatus according to claim 15 wherein event data is transmitted from successive storage locations of each terminal beginning with a preselected location, whereby event data is received by the master station in the chronological order with which the events were detected.

17. Apparatus according to claim 8 wherein said second means at each terminal generates a change of status signal upon detection of the first change of status, and means are provided for transmitting the generated change of status signal to the master station to correlate elapsed time data at remote locations with absolute time at the master station.

18. Apparatus according to claim 17 wherein said master station means includes, means responsive to a received change of status signal for storing a representation of absolute time upon receipt of the change of status signal.

19. Apparatus according to claim 17 wherein said second means at each terminal generates a sequence of events signal upon detection of a second event, the generated sequence of events signal being subsequently transmitted to said master station means to indicate that a sequence of at least two status changes has been detected by said second means.

20. Apparatus according to claim 19 wherein said master station means is responsive to a received sequence of events signal to repeatedly request the sending terminal to transmit data from storage to said master station means, the sending terminal having means responsive to the first request to transmit event data stored at a predetermined number of successive locations beginning with a preselected location, and the sending terminal having means responsive to each request subsequent to the first request to transmit event data stored at the predetermined number of locations immediately succeeding those locations from which event data was previously transmitted, until no further request is made by said master station means.

21. Apparatus according to claim 20 wherein said master station means checks the data that is stored in each of the predetermined number of storage locations upon receipt of such data, said master station means ceasing to request further event data when the last received data contains at least one zero.

22. Apparatus according to claim 21 wherein said master station means generates a clear memory signal upon detection of the first received data which contains at least one zero, the clear memory signal subsequently being transmitted to said second means to notify said second means to store zeros at those location of said storage means that are utilized for storage of event data.

* * * * *